May 11, 1937.  H. W. SNYDER  2,079,666
FLUID PRESSURE CONTROL MEANS
Filed June 9, 1934
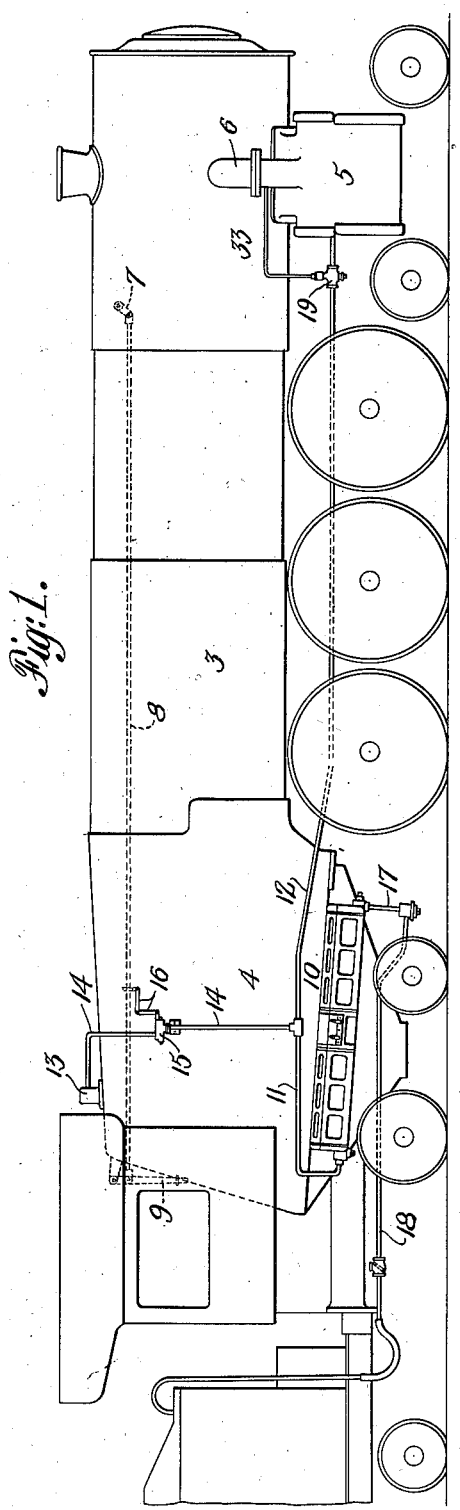
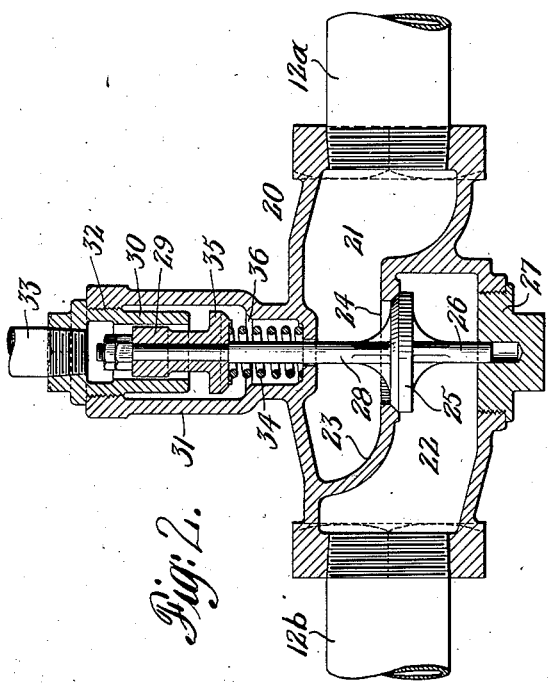
INVENTOR
Herbert W. Snyder
BY
Synnestvedt & Lechner
ATTORNEYS Patented May 11, 1937

2,079,666

UNITED STATES PATENT OFFICE 2,079,666

FLUID PRESSURE CONTROL MEANS

Herbert W. Snyder, Lima, Ohio

Application June 9, 1934, Serial No. 729,758

9 Claims. (Cl. 110—57)

This invention relates to fluid pressure control means and is particularly concerned with a special purpose valve mechanism or device.

More specifically, the invention has reference to a check valve device for use in a fluid pressure line in which the pressure is subject to pulsations or fluctuations.

It is one of the major objects of the invention to provide a check valve for use in situations of the type just mentioned, which check valve will be retained in open position notwithstanding the fluctuations in pressure. The advantage of this will appear more clearly as this description proceeds, although it is mentioned at this point that heretofore considerable difficulty has been encountered with check valves employed in fluid pressure lines where the pressure is pulsating in character because of the tendency of the valve to vibrate or reciprocate under the influence of the pulsations. In some instances, check valves used with pulsating pressure have been repeatedly lifted or thrown open with such violence as to hammer out or break some part of the valve.

How the foregoing, as well as related objects and advantages, are attained, will appear from the following description taken in connection with the accompanying drawing, in which—

Figure 1 is a somewhat diagrammatic side elevational view of a locomotive illustrating the mechanism of this invention employed in a fluid pressure system of the type to which the mechanism is especially suited; and Figure 2 is a sectional view through the valve mechanism per se.

While, as indicated, the invention is especially useful in the association of parts to be described in connection with Figure 1, it is to be understood that at least certain features of the invention are equally applicable in other equipment which is similar as to general operation.

The boiler of the locomotive is identified by the numeral 3 in Figure 1. The locomotive has a fire-box 4 and cylinders, one of which appears at 5. The cylinder 5 is supplied with steam from the boiler through the steam pipe 6 which, of course, is controlled by a throttle valve which may be actuated by the arm 7, rod 8 and hand lever 9. The mechanism generally designated by the numeral 10 constitutes an air preheater for the air entering the fire-box 4. This heater incorporates heat transfer elements which are supplied with steam preferably through pipes 11 and 12 when the locomotive is working steam, it being noted that pipe 12 extends forwardly for connection with an exhaust cavity associated with cylinder 5. When the locomotive is not working steam, the heater may be supplied with heating medium from any suitable source such as the turret 13, for which purpose a pipe 14 extends from the turret for connection with pipe 11. A valve mechanism 15 is positioned in pipe 14 to control flow therethrough and is preferably actuated as by links 16 connected with the throttle rod 8, these links and the valve being so arranged that upon movement of the throttle lever 9 to close the main throttle, the valve 15 is opened, and vice versa.

A condensate drain 17 serves as the outlet from the heater elements, and if desired this drain may be coupled with the water space of the tender as by means of the pipe 18.

It is to be noted that the air preheater and the steam supply and control mechanism therefor described above, constitutes no part of the present invention per se, but is described and claimed in my copending application Serial No. 713,966, filed March 5th, 1934.

The present invention, however, has particular reference to and use in conjunction with a preheater system of the type described for reasons which will now be set forth. It will be observed that with the steam supply and control system of Figure 1, the air preheater 10 is supplied with steam from the exhaust cavity of cylinder 5 at all times when the locomotive is working steam. The steam exhausted from the cylinders, however, is pulsating and the pulsations are especially marked at start and low speeds of operation. As far as the air preheater itself is concerned, the pulsations are of no material consequence but for various reasons it is desirable to include a check valve in the exhaust line extended to the heater. The valve, of course, preferably opens under the influence of steam passing to the heater, and closes upon substantial cessation of steam pressure or upon overbalance of pressure in the portion of pipe 12 extended rearwardly of the valve. For example, when the throttle lever 9 is moved to close the throttle and shut off the steam supply to the cylinders, the valve 15 opens and supplies steam to pipe 11, and from thence to the heater elements. In the absence of a check in pipe 12, this pressure coming from the turret 13 would of course flow forwardly to the exhaust cavity of cylinder 5.

In accordance with the present invention I employ a valve device generally indicated at 19 in Figure 1, this device being shown in enlarged section in Figure 2. As seen in Figure 2, a valve body 20 is provided with an inlet cavity 21 and an outlet cavity 22, the former of which is coupled as by means of the pipe section 12a with the exhaust cavity of cylinder 5, and the latter of which is coupled with an end 12b of the pipe leading to the heater. A partition 23 divides the chambers 21 and 22 and is provided with an opening 24 having a valve seat around it with which the valve member 25 cooperates. The valve has a lower stem 26 acting as a guide in a suitable bore provided in the removable cap 27, which latter plugs an opening through which the valve may be inserted and removed.

The valve 25 is shown as being of the poppet type and is positioned so that normal flow of fluid from the inlet chamber 21 to the outlet chamber 22 has a tendency to open the valve, and further so that a reverse flow of fluid tends to close the valve. The valve is further provided with an actuating stem 28 which is extended through an aperture in the valve body 20 for connection with the piston element 29 adapted to work in cylinder 30. While the piston and cylinder mechanism 29 and 30 may be mounted and constructed more or less independently of the valve body 20, I prefer to employ the structure shown in Figure 2, in which a casing 31 projects upwardly from the valve body 20 to surround and support the piston and cylinder mechanism. The cylinder 30 is conveniently formed more or less as a plug screw-threaded into the casing 31 as at 32 and provided with a threaded aperture to receive pipe 33 which, as seen in Figure 1, is extended for connection with the steam pipe 6.

Check valve 25 is preferably normally urged toward closed position by a compression spring 34 reacting between a part of the valve body 20 and an abutment carried by the valve stem 28. The abutment in the mechanism shown takes the form of a valve member 35 which is adapted to seat at 36 around the aperture through which the stem 28 projects into the valve body 20.

In operation, when the throttle lever 9 is actuated to open the throttle valve, the steam pressure delivered to cylinder 5 through steam pipe 6 is also admitted through pipe 33 into cylinder 30 of the check valve mechanism, and this pressure forces piston 29 downwardly with the result that the check valve 25 is opened and the valve member 35 is seated at 36 so as to prevent pressure loss through the aperture through which the stem 28 projects into the valve body 20. The exhaust steam may now freely pass from cylinder 5 through the line 12 to the heater. Furthermore, since the pressure of the steam in pipe 6 is relatively constant or non-pulsating, the check valve 25 is retained in its open position in a manner which prevents vibration or reciprocations under the influence of the pulsations in the exhaust from the cylinder. On the other hand, when the throttle lever 9 is actuated to close the throttle valve, the pressure in the steam pipe 6 is rather promptly dissipated and the valve 25 will be caused to close under the influence of spring 34. The steam pressure which is at this time being delivered to the pipe 11 from turret 13 will also flow into pipe 12 and aid in maintaining valve 25 tight against its seat.

From the foregoing it will be seen that the present invention provides a special purpose valve mechanism of novel character, according to which the valve may be employed as a check in a steam line carrying steam at fluctuating or pulsating pressures. The movements of the valve, of course, are of an entirely automatic nature, and the valve will properly close under the influence of reverse fluid flow. In addition, the mechanism has been worked out so as to avoid leakage or loss of the live steam or other fluid utilized to actuate the valve.

It is also pointed out that the operation of the check valve in line 12 and of the valve 15 in line 14, are interrelated in such a way that the check valve is retained in open position when valve 15 is closed (notwithstanding pressure fluctuations) and that the check valve is retained in closed position when valve 15 is opened. Thus, a positive control is superimposed on the normal and usual operation of the check valve.

While I may use any suitable or convenient source of relatively constant fluid pressure (as compared with the exhaust steam) to actuate the check valve, I prefer to take steam from the steam pipe 6 for this purpose, since the exhaust steam and the steam in pipe 6 are both cut off together by the main throttle valve. The desired interrelation between the action of the check valve and the control valve 15 also results when employing the pressure in the steam supply pipe 6 for control of the check valve.

I claim:

1. For a locomotive fire-box air preheater incorporating heat exchange elements, a pipe for supplying locomotive cylinder exhaust steam to said elements for heating purposes, a check valve in said pipe arranged so that flow of exhaust steam tends to open the valve, a fluid pressure actuated device for opening the valve, and means for supplying steam from the locomotive boiler to said device.

2. In combination with a locomotive auxiliary adapted to utilize cylinder exhaust steam, a pipe for supplying exhaust steam to the auxiliary, a check valve in said pipe movable to open position under the influence of exhaust steam, a source of fluid at relatively constant pressure as compared with the pulsating exhaust steam pressure at low speeds of operation, a fluid pressure device associated with said valve for moving the valve toward open position, and a pipe for supplying actuating fluid from said source to said device.

3. For a locomotive fire-box air preheater incorporating heat exchange elements, a pipe for supplying locomotive cylinder exhaust steam to said elements for heating purposes, a check valve positioned in said pipe so that exhaust steam pressure tends to move it toward open position, and means for maintaining the valve in open position at times when the exhaust steam tends to open the valve, whereby to avoid vibration or reciprocation of the valve under the influence of exhaust pulsations.

4. For a locomotive fire-box air preheater incorporating heat exchange elements, a pipe for supplying locomotive cylinder exhaust steam to said elements for heating purposes, a check valve positioned in said pipe so that exhaust steam pressure tends to move it toward open position, and fluid pressure means for urging the valve toward open position, said means deriving its actuating fluid from a source on the locomotive.

5. In combination with a locomotive auxiliary adapted to utilize cylinder exhaust steam, a pipe for supplying exhaust steam to the auxiliary, a check valve positioned in said pipe so that exhaust steam pressure tends to move it toward open position, and means for maintaining the check valve in open position irrespective of the pulsations in pressure of the exhaust steam so long as pulsating pressure exists in said pipe.

6. In combination with a locomotive auxiliary adapted to utilize cylinder exhaust steam, a pipe for supplying exhaust steam to the auxiliary, a check valve positioned in said pipe so that exhaust steam pressure tends to move it toward open position, stop means for limiting the opening movement of the check valve, and means for maintaining the check valve against the stop means at times when pulsating exhaust steam pressure exists in said pipe.

7. In combination with a locomotive auxiliary adapted to utilize cylinder exhaust steam and with a source of fluid at relatively constant pressure, a pipe for supplying exhaust steam to the auxiliary, a check valve positioned in said pipe so that exhaust steam pressure tends to move it toward open position, and a fluid pressure motor device associated with said valve for maintaining it in a given open position and thus preventing vibration or reciprocation of the valve under the influence of pulsations in the exhaust steam pressure, said device deriving motive fluid at relatively constant pressure from said source.

8. In combination with a locomotive auxiliary adapted to utilize cylinder exhaust steam, a pipe for supplying exhaust steam to the auxiliary, a check valve positioned in said pipe so that exhaust steam pressure tends to move it toward open position, means for normally urging the check valve toward closed position, a source of fluid at relatively constant pressure, and a fluid pressure device for urging the check valve toward open position, said device being coupled with said source of relatively constant pressure to receive fluid therefrom.

9. In combination with a locomotive auxiliary adapted to utilize cylinder exhaust steam, a pipe for supplying exhaust steam to the auxiliary, a check valve positioned in said pipe so that exhaust steam pressure tends to move it toward open position, a fluid pressure device associated with said valve for moving the valve toward open position, and a pipe for supplying steam from a cylinder supply pipe to said device.

HERBERT W. SNYDER.